(12) United States Patent
Livingston et al.

(10) Patent No.: US 9,345,369 B2
(45) Date of Patent: May 24, 2016

(54) BAGGING TOILET

(75) Inventors: Rod Livingston, Richmond, IN (US); Robert Roczynski, Cheshire, CT (US)

(73) Assignee: Dry Flush LLC, Hamden, CT (US)

( * ) Notice: Subject to any disclaimer, the term of this patent is extended or adjusted under 35 U.S.C. 154(b) by 0 days.

(21) Appl. No.: 14/238,960

(22) PCT Filed: Aug. 21, 2012

(86) PCT No.: PCT/US2012/051704
§ 371 (c)(1),
(2), (4) Date: Feb. 14, 2014

(87) PCT Pub. No.: WO2013/028679
PCT Pub. Date: Feb. 28, 2013

(65) Prior Publication Data
US 2014/0208499 A1   Jul. 31, 2014

Related U.S. Application Data

(60) Provisional application No. 61/644,098, filed on May 8, 2012, provisional application No. 61/526,297, filed on Aug. 23, 2011.

(51) Int. Cl.
*A47K 11/02*  (2006.01)

(52) U.S. Cl.
CPC .............. *A47K 11/02* (2013.01); *A47K 11/026* (2013.01)

(58) Field of Classification Search
CPC ........ A47K 11/026; B65B 9/00; B65B 31/02; B65B 31/021; B65B 31/024; B65D 81/20

USPC ........ 4/449, 479, 484; 53/452, 459, 567, 549, 53/570, 576, 558, 568, 571
See application file for complete search history.

(56) References Cited

U.S. PATENT DOCUMENTS

| | | | | |
|---|---|---|---|---|
| 2,205,902 A | * | 6/1940 | McMahan | 415/126 |
| 3,452,368 A | | 7/1969 | Couper | |
| 3,619,822 A | * | 11/1971 | Carmichael | 4/484 |
| 5,035,104 A | * | 7/1991 | Helling et al. | 53/441 |
| 5,088,134 A | * | 2/1992 | Douglas | 4/484 |
| 5,125,526 A | * | 6/1992 | Sumanis | 220/263 |
| 5,193,231 A | * | 3/1993 | Stender | 4/449 |
| 5,205,109 A | * | 4/1993 | Conway | 53/403 |
| 5,355,789 A | * | 10/1994 | Suzuki et al. | 100/92 |

(Continued)

FOREIGN PATENT DOCUMENTS

| | | |
|---|---|---|
| CH | 525134 A | 7/1972 |
| EP | 0668737 B1 | 3/1997 |

(Continued)

OTHER PUBLICATIONS

International Search Report and Written Opinion for PCT/US2012/051704, dated Nov. 29, 2012.

*Primary Examiner* — Lauren Crane
*Assistant Examiner* — Erin Deery
(74) *Attorney, Agent, or Firm* — Bachman & LaPointe, P.C.

(57) ABSTRACT

A waste receiving apparatus such as a toilet has a body having an interior and an upper waste receiving opening. A bagging material storage area holds the bag supply of continuous bag material to receive waste introduced through the waste receiving opening. A motor is provided for rotating accumulated waste relative to the bag supply. A fan is provided for pressurizing and/or depressurizing an interior of the body.

13 Claims, 19 Drawing Sheets

(56) References Cited

U.S. PATENT DOCUMENTS

| | | | |
|---|---|---|---|
| 5,444,962 A * | 8/1995 | Bonnet | 53/417 |
| 5,884,346 A | 3/1999 | Hengl | |
| 6,851,251 B2 * | 2/2005 | Stravitz | 53/567 |
| 7,434,377 B2 * | 10/2008 | Stravitz et al. | 53/567 |
| 2005/0115207 A1 * | 6/2005 | Chomik | 53/459 |
| 2007/0219425 A1 * | 9/2007 | Moore | 600/300 |
| 2009/0255046 A1 | 10/2009 | Carter et al. | |

FOREIGN PATENT DOCUMENTS

| | | |
|---|---|---|
| EP | 0906743 A1 | 4/1999 |
| EP | 2402517 A1 | 1/2012 |
| SU | 1306815 A1 | 4/1987 |
| SU | 1719719 A1 | 3/1992 |

\* cited by examiner

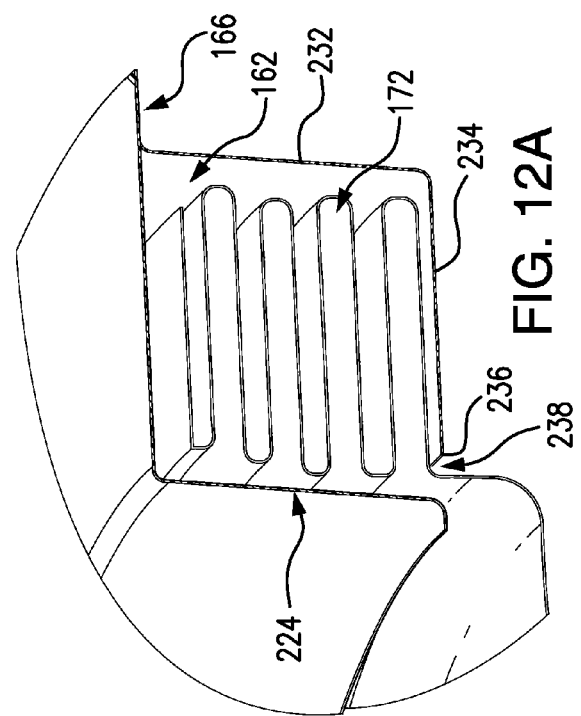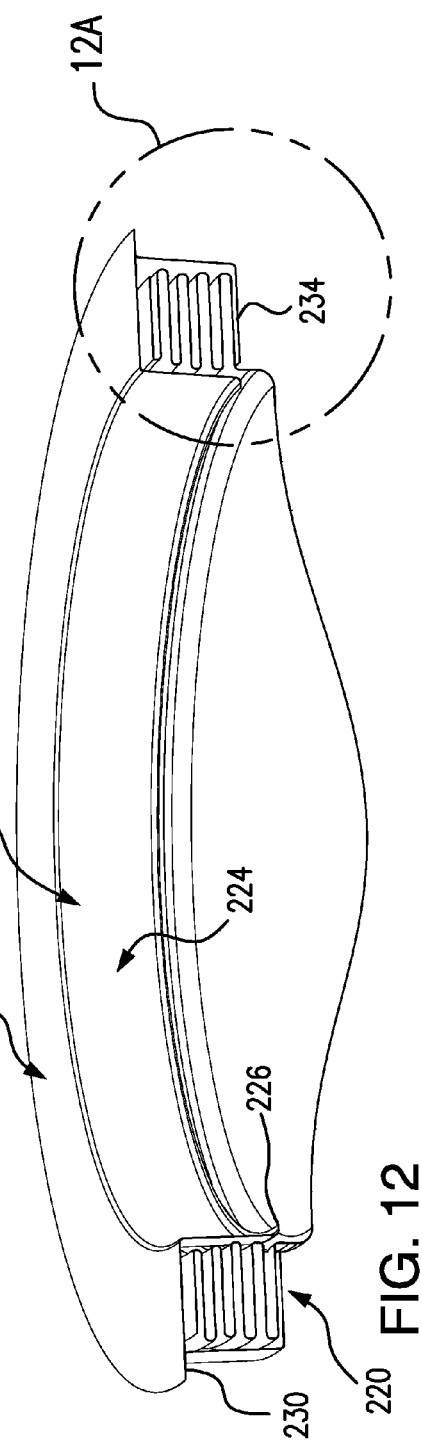

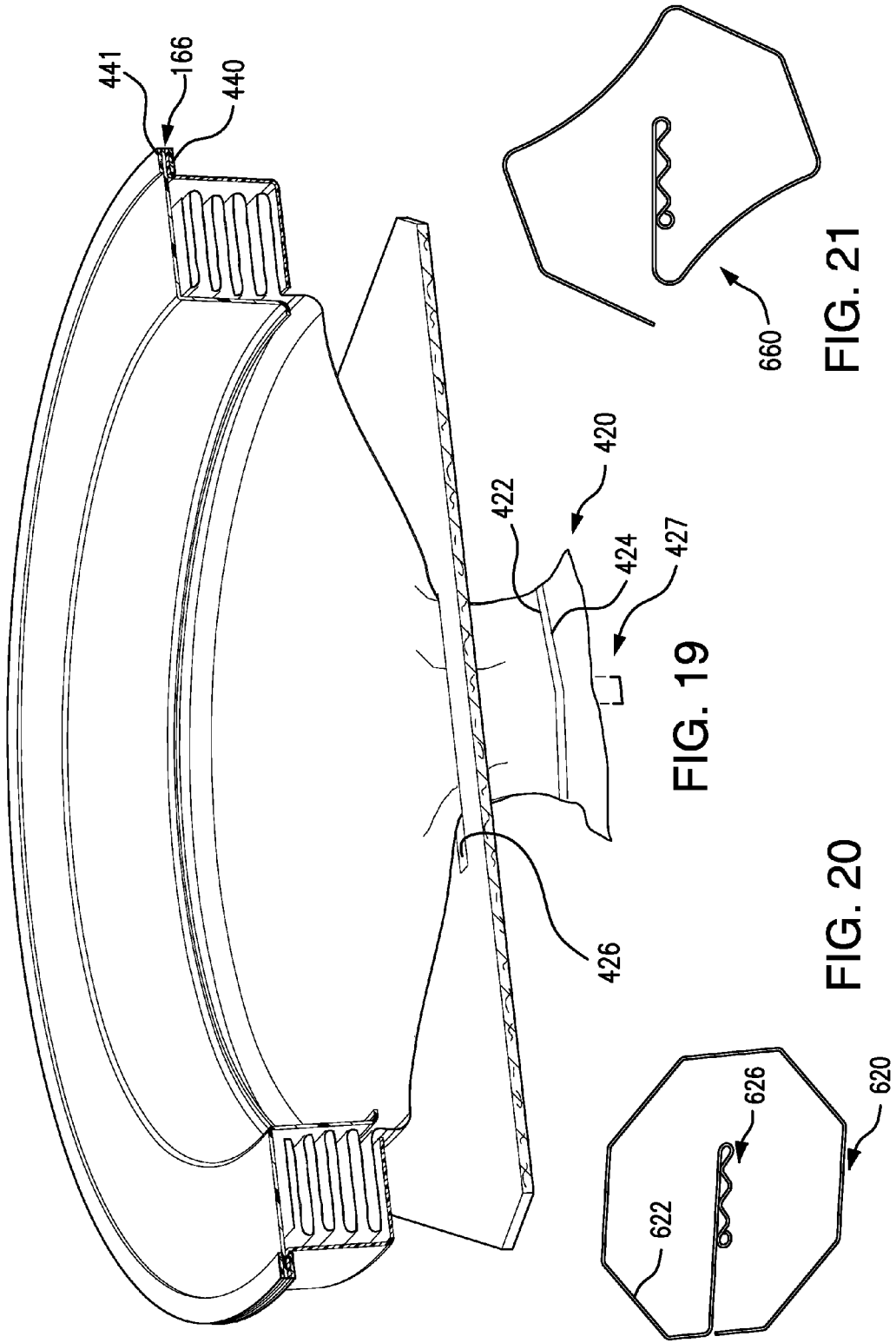

BAGGING TOILET

CROSS-REFERENCE TO RELATED APPLICATIONS

Benefit is claimed of U.S. Patent Application Ser. No. 61/526,297, filed Aug. 23, 2011, and Ser. No. 61/644,098, filed May 8, 2012, both entitled "Bagging Toilet", the disclosures of which are incorporated by reference in their entireties herein as if set forth at length.

BACKGROUND OF THE INVENTION

The invention relates to toilets. More particularly, the invention relates to dry portable toilets.

There are situations where ordinary plumbed toilets are difficult or impossible to install. These include construction sites, public events, campers, water and aircraft, and houses where water is not available. Products sold to fill these niches run the gamut from plastic pails to full bathrooms plumbed in such a way as to collect waste in holding tanks for later disposal. All of these devices have drawbacks related to unpleasantness during use and or emptying of holding tanks.

During use, users are often confronted by the sight of feces in holding tanks directly under the toilet seat. As air travelers are aware, some flushable toilets recycle a blue liquid to conserve water. Lower price devices with bags require the user to insert and subsequently seal individual bags.

Holding tanks must be emptied at special facilities prepared to deal with such waste. The task is unpleasant enough that some boaters, and campers will avoid using their onboard toilets to avert the displeasing task of cleaning the so-called black water holding tanks. Furthermore, holding tanks must be purged and cleaned and have chemicals added to prevent the buildup of bacteria and odor problems. Moreover there are strict laws governing the dumping of holding tanks.

There are several patents that include bag systems, including some that use a continuous tube feed systems from annular dispensers under the seat. Many of these have rather complicated mechanical systems that dispense bags, flatten them and seal them. In all cases, moving machinery in such close proximity to delicate body parts is not comforting.

U.S. Pat. No. 3,452,368 is representative of a group of patents, many of which are improvements on it. It is a box, fitted with a toilet seat and a dispenser for an elongated tube of plastic film. A system of articulated levers, springs and rollers manage the dispensing and sealing of the plastic. The disadvantage of this family of patents is the complicated mechanisms required to manage the plastic film. Some of these systems twist the plastic to close it and some use heat sealing techniques.

An alternative configuration is found in U.S. Pat. No. 5,088,134 in which a waste-receiving bag is opened to receive waste and then temporarily closed until the next use whereupon it is opened again.

In a separate art, a rotary bagging system has been proposed for disposal of diapers and related waste. An example of this is found in US Pregrant Publication 2005/0115207.

SUMMARY OF THE INVENTION

One aspect of the invention involves a toilet having a body having an interior and an upper waste-receiving opening. A bagging material storage area holds the bag supply of continuous bag material to receive waste introduced through the waste receiving opening. Means are provided for rotating accumulated waste relative to the bag supply to produce a twist in the bag material to enclose the waste. Means are provided for pressurizing and/or depressurizing an interior of the body.

In various implementations, the supply may comprise an annular housing having an outlet through which the bag material projects. The outlet may be a lower outlet along a bottom of the annular housing. The means for rotating may comprise a motor coupled to a support to rotate the support while the bag supply remains stationary. The means for pressurizing may comprise a first fan and the toilet may further comprise a second fan for depressurizing the interior. The first fan may be a first squirrel cage fan and the second fan may be a second squirrel cage fan.

Another aspect of the disclosure involves a method for operating a toilet. Waste is received through an opening of a body of the toilet and into a receiving portion of a continuous bag. The interior of the body is pressurized to compress the bag around the waste. The bag is twisted to isolate the received waste from a portion of the bag thereabove. A new receiving portion of the bag is expanded above the twist.

In various implementations, the pressurizing may be to a gauge pressure of at least 1.5 inches (38 mm) of water and a depressurizing may be to a gauge pressure of at least 2.5 inches (64 mm) of water. The method may be performed repeatedly with each new receiving portion replacing the prior receiving portion. The expanding may comprise depressurizing the interior around the bag below an ambient pressure. The depressurizing may be performed by a first fan and not a second fan whereas the pressurizing may be performed by the second fan and not the first fan. The method may further include installing the continuous bag. The installing may comprise installing a cartridge. The cartridge may comprise an annular reservoir forming the bagging material storage area and the cartridge may further comprise the bag supply of continuous bagging material. The installing may comprise securing the bag rotationally relative to a support. A plate member may be secured to the bag supply. The installing may comprise extending the plate member away from the reservoir and engaging the plate member to a support. The plate member and support may interfit to allow the support to transmit rotation to the plate member. The support may be a bucket and the engaging may place the plate member into the bucket.

Another aspect of the disclosure involves a method for operating a toilet. Waste is received through an opening of a body of the toilet and into a receiving portion of a continuous bag. The bag is twisted to isolate the received waste from a portion of the bag thereabove. A new receiving portion of the bag is expanded above the twist by depressurizing the interior of the body.

Another aspect of the disclosure involves a replacement bag cartridge combination for a disposal apparatus (e.g., waterless toilet). The cartridge comprises a reservoir and a member (e.g., a plate member) for rotationally interfitting with a support of the toilet. The cartridge further comprises a continuous bag material comprising an accumulation contained within the reservoir and a portion secured to the member.

In various implementations, the member may comprise corrugated material and/or the member may be polygonal. The continuous bag material may extend through an aperture in the member.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 12 is a sectional view of the reservoir of FIG. 11.

FIG. 19 is a cutaway view of a continuous bagging material cartridge and plate member/keying member.

FIG. 20 is a view of an alternate keying member.

FIG. 21 is a view of an alternate keying member.

Like reference numbers and designations in the various drawings indicate like elements.

DETAILED DESCRIPTION

Figure 1:
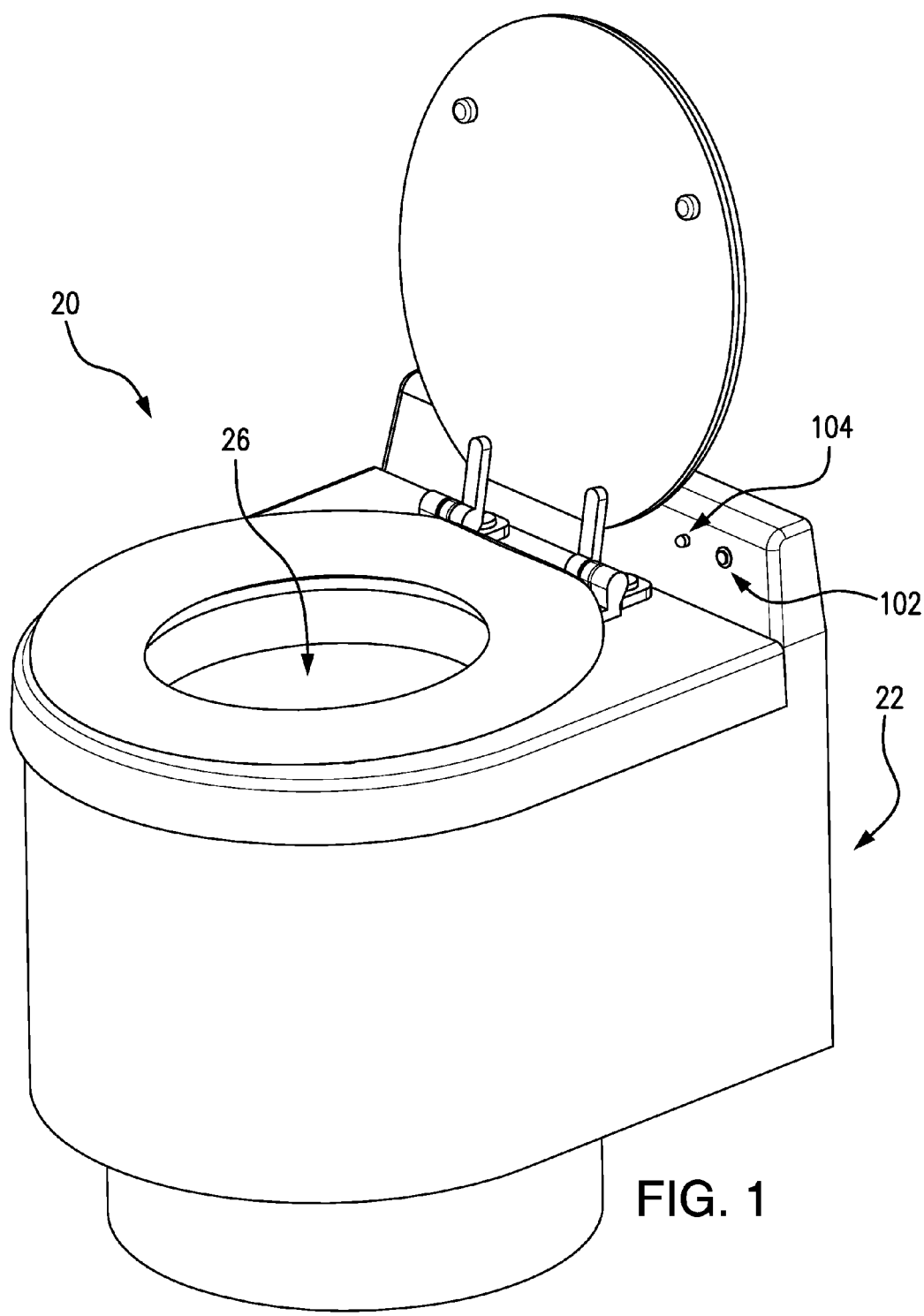
FIG. 1 is a view of a bagging toilet.

FIG. 1 shows a bagging toilet 20. The exemplary toilet 20 comprises a body (e.g., an assembly) 22 having an interior 24 and a waste-receiving opening 26. An exemplary body comprises a main body 28 with a seat assembly 30 (e.g., including a seat 32 and a cover 34) thereatop. A sidewall 40 of the main body surrounds the interior 24. The exemplary sidewall 40 extends upward from a bottom member 42 mounted atop a base sidewall 44 surrounding a base compartment 46. The exemplary body further includes an annular inwardly-directed web 50 surrounding the opening 26 slightly recessed below an upper rim 52 of the sidewall 40. A cover 54 mounts over the rim and has a depending collar 56 extending downward to a lower rim 58. The various body components may be of appropriate molded plastics, fiberglass, or the like. For example, polypropylene.

Figure 2:
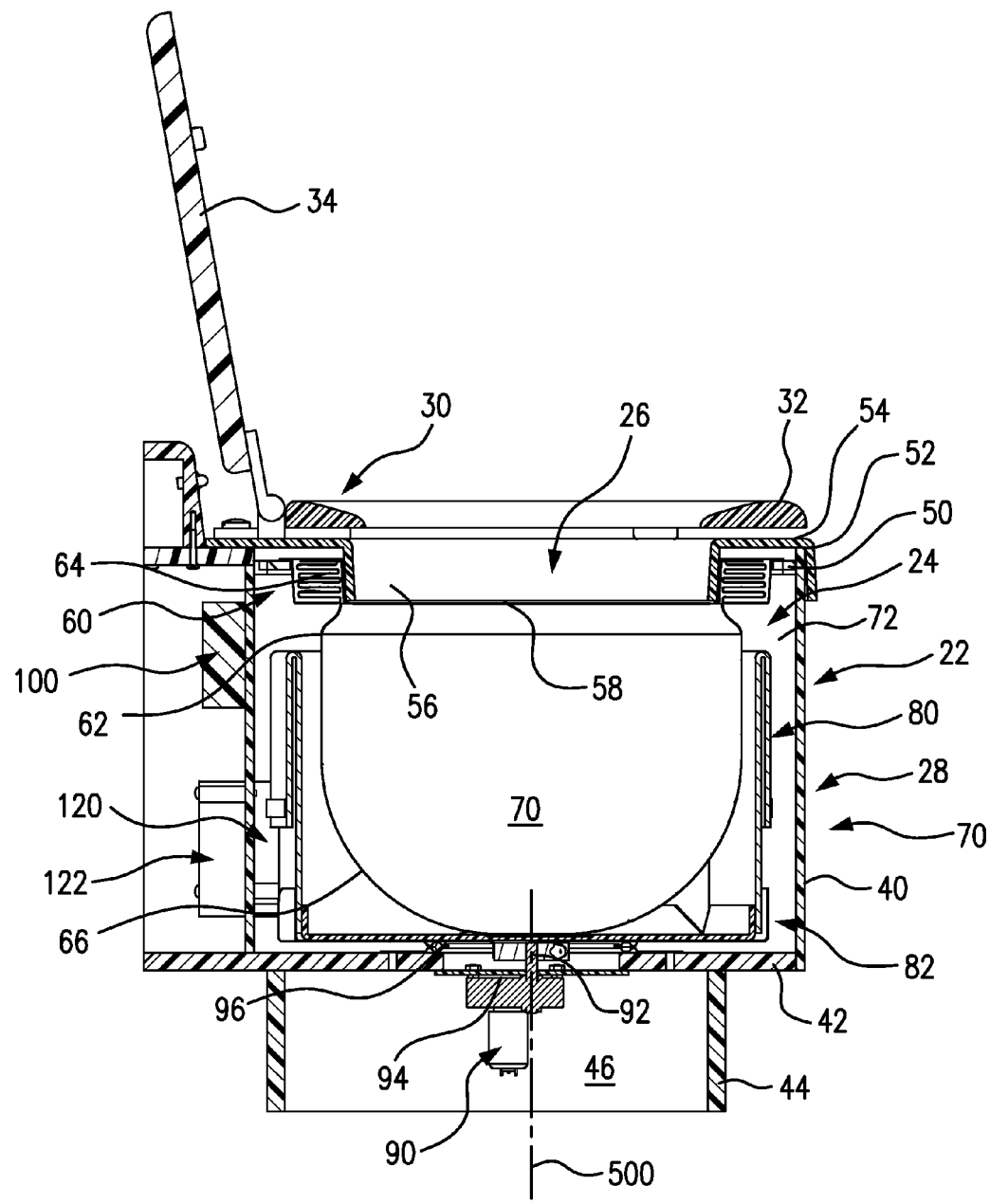
FIG. 2 is a central longitudinal/vertical sectional view of the toilet of FIG. 1.
Figure 17:
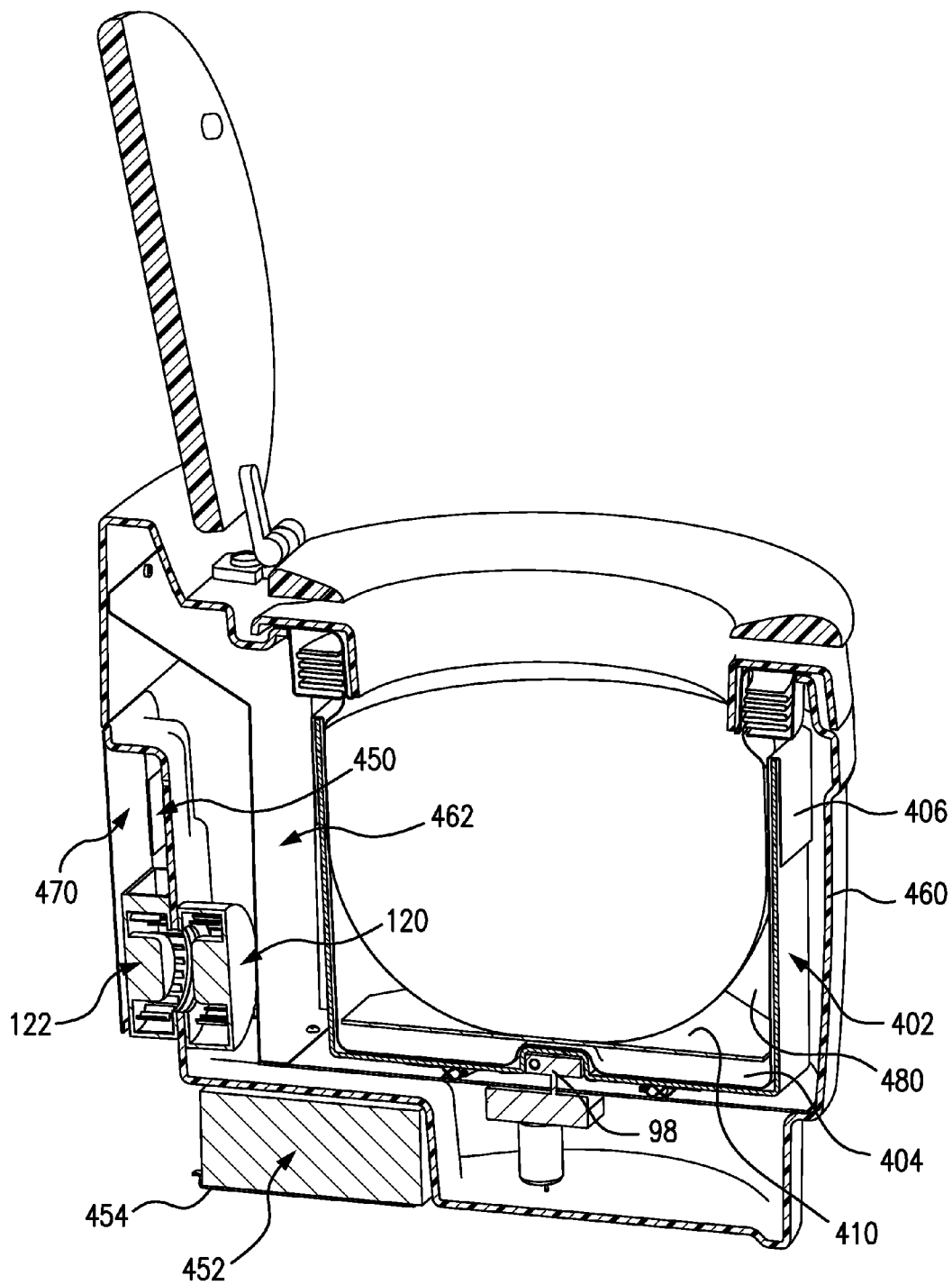
FIG. 17 is a vertical/longitudinal cutaway view of the toilet of FIG. 16.
Figure 18:
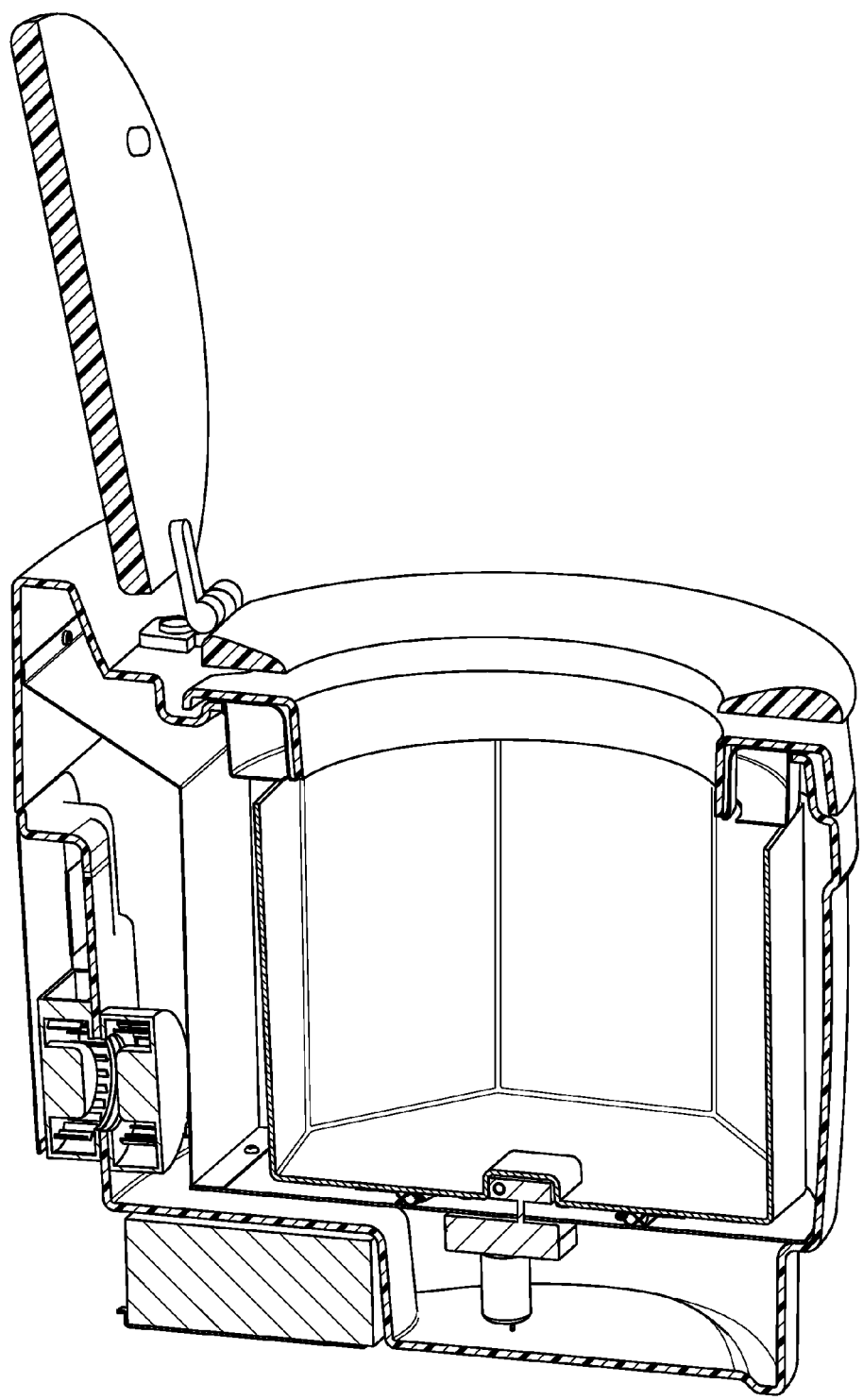
FIG. 18 is a vertical/longitudinal cutaway view of the toilet of FIG. 16 with bag components removed to show detail.

As is discussed further below, the collar protrudes within a cartridge 60 of a continuous bagging material (bag supply or merely bag) 62 (e.g., of polypropylene or polyethylene). The cartridge contains an accumulation 64 with a material with a waste-receiving portion 66 of the material depending downwardly into the interior and dividing a waste-receiving volume 70 from an outer portion 72 of the interior 24. The interior 24 further contains a container 80 into which the waste receiving portion 66 depends. The exemplary container 80 is relatively rigid (e.g., compared to the bagging material). As is discussed below, an exemplary container 80 comprises a corrugated boxboard box. The container 80 is carried by a support (platform) 82 within the interior 24. The support 82 is mounted for rotation about an axis 500 (e.g., a vertical axis). As a means for rotating the box, the toilet may include an electric motor 90. An exemplary electric motor is vertically mounted and coupled to a shaft 92 along the axis 500 via a transmission 94 (e.g., a geared reduction transmission). FIG. 2 also shows a bearing system 96 supporting the support 82 for rotation about the axis 500. A clamp 98, being square in shape, transmits rotational torque to support 82 via a square hole in support 82. This is more clearly seen in FIG. 17. Additional routine mounting features, etc., may be provided. As is discussed further below, the motor 90 may rotate the support 82 while the bag supply remains stationary and, thereby, imparting twist to/along the receiving portion 66 to isolate received waste from a portion of the bagging material thereabove. As is discussed further below, this leaves a new receiving portion of the bagging material above the twist in a process which may be repeated a number of times before the box is full and/or the bagging material expended.

A control box 100 may contain a controller (e.g., a microcontroller) and a power source (e.g., a battery). The battery may be coupled to power the controller and the various motors discussed both above and below. The power may alternatively be externally supplied (e.g., DC power by the recreational vehicle or boat associated with the toilet). The controller may receive user and/or sensor input (e.g., from a switch 102 (FIG. 1) (e.g., a pushbutton) used by the user to flush and one or more display lights 104 for status information or a more complex informative touch panel arrangement).

As is discussed further below, one or more fans may be used to affect pressure within the interior (namely, alternatingly pressurizing the portion 72 of the interior surrounding the bagging material to compress the bagging material around received waste and, after the twisting and isolation of the waste, depressurizing the portion 72 to withdraw bagging material from the cartridge and expand the new receiving portion of the bag (e.g., not merely relieving the pressure but depressurizing below an ambient pressure)). In the exemplary implementation, respective fans 120 and 122 are provided for respectively pressurizing the outer portion 72 and depressurizing it. The exemplary fans 120 and 122 are squirrel cage-type centrifugal fans each with its own associated electric motor. The exemplary fans are respectively mounted to the inside and to the outside of the sidewall (namely, along a rear wall section of the sidewall).

An exemplary depressurizing is to a greater gauge pressure than is the pressurizing. An exemplary pressurizing is to a gauge pressure of 2.0 inches (5.0 cm) of water; whereas, an exemplary depressurizing is to a gauge pressure of 3.1 inches (7.9 cm) of water. More broadly, exemplary pressurizing is to at least 1.0 inches (2.5 cm) of water, more narrowly, 1.5-3.0 inch (3.8-7.6 cm); exemplary depressurizing is to at least 2.0 inches of water, more narrowly, at least 2.5 or 2.5-3.5 inches (6.4 or 6.4-8.9 cm).

Figure 3:
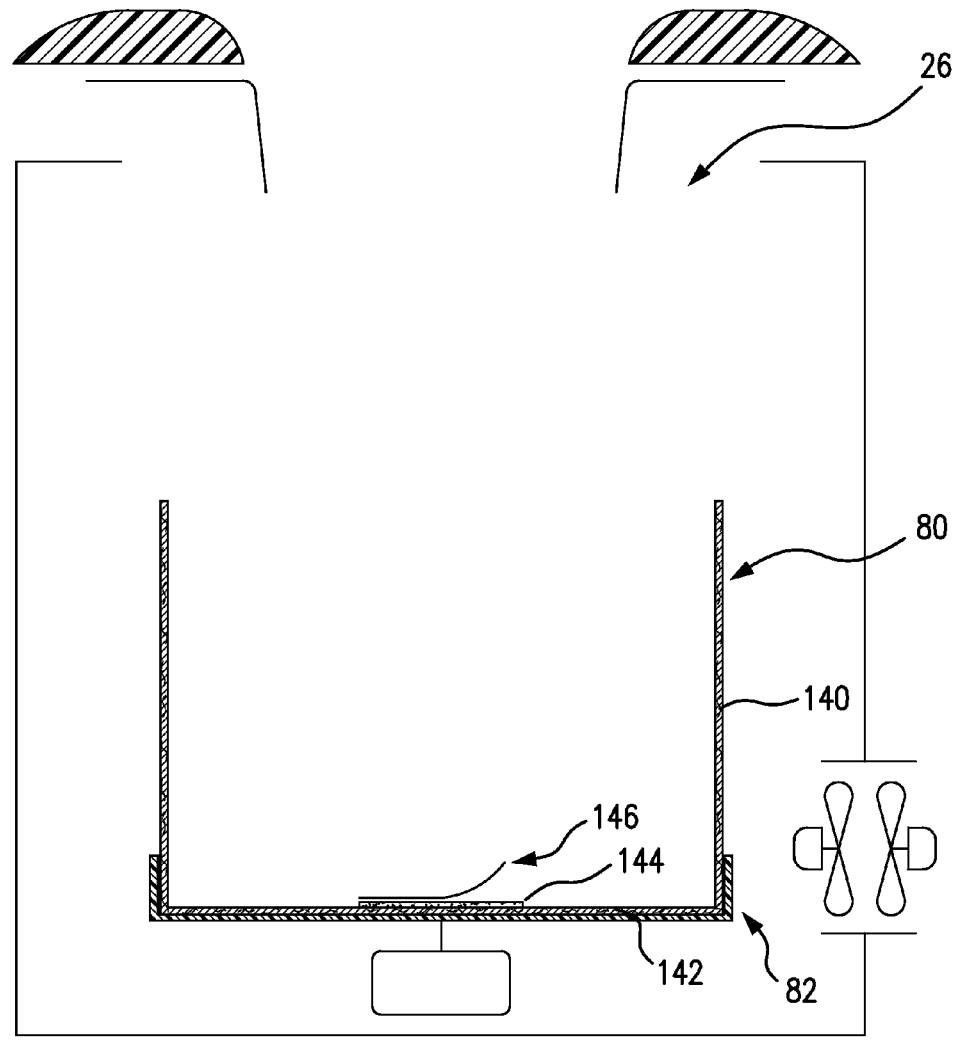
FIG. 3 is a schematic view of the toilet of FIG. 1 in a first stage of cartridge installation.
Figure 4:
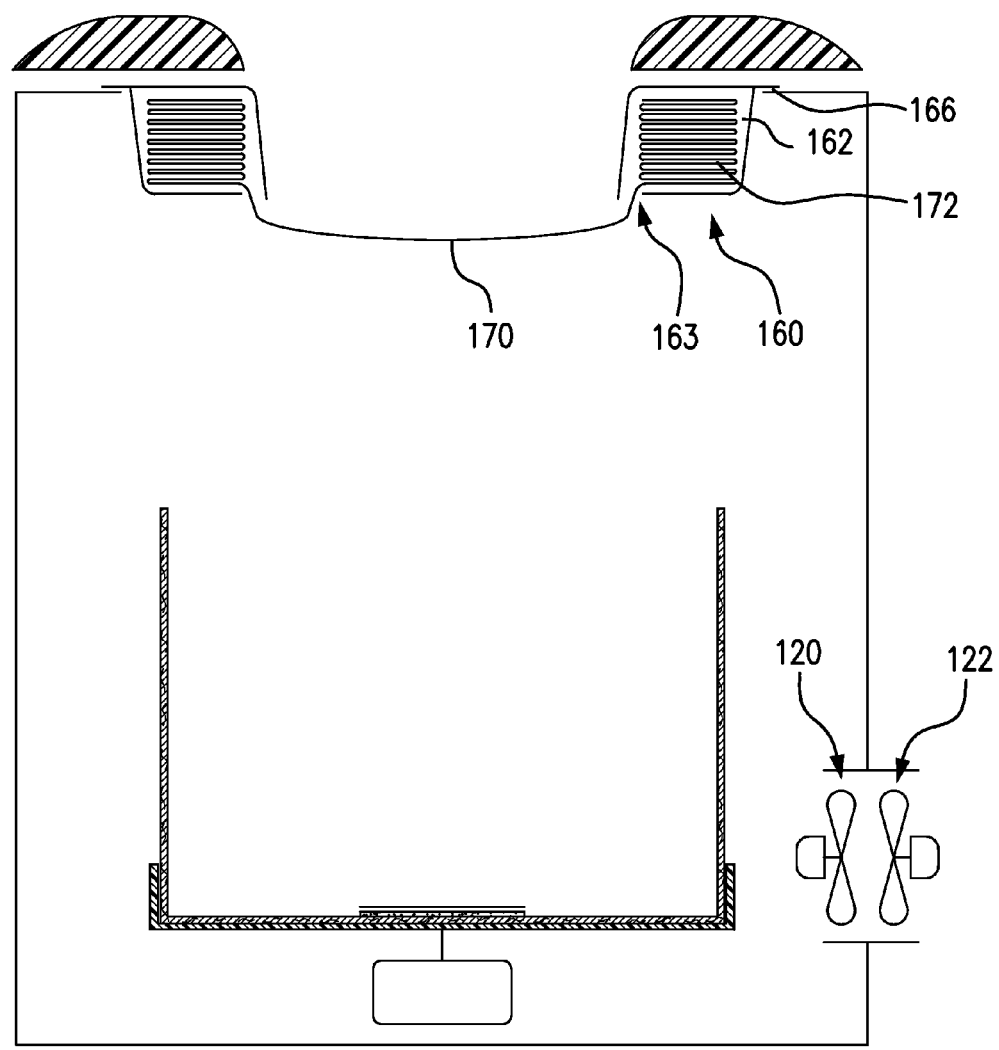
FIG. 4 is a schematic view of the toilet in a subsequent stage.
Figure 5:
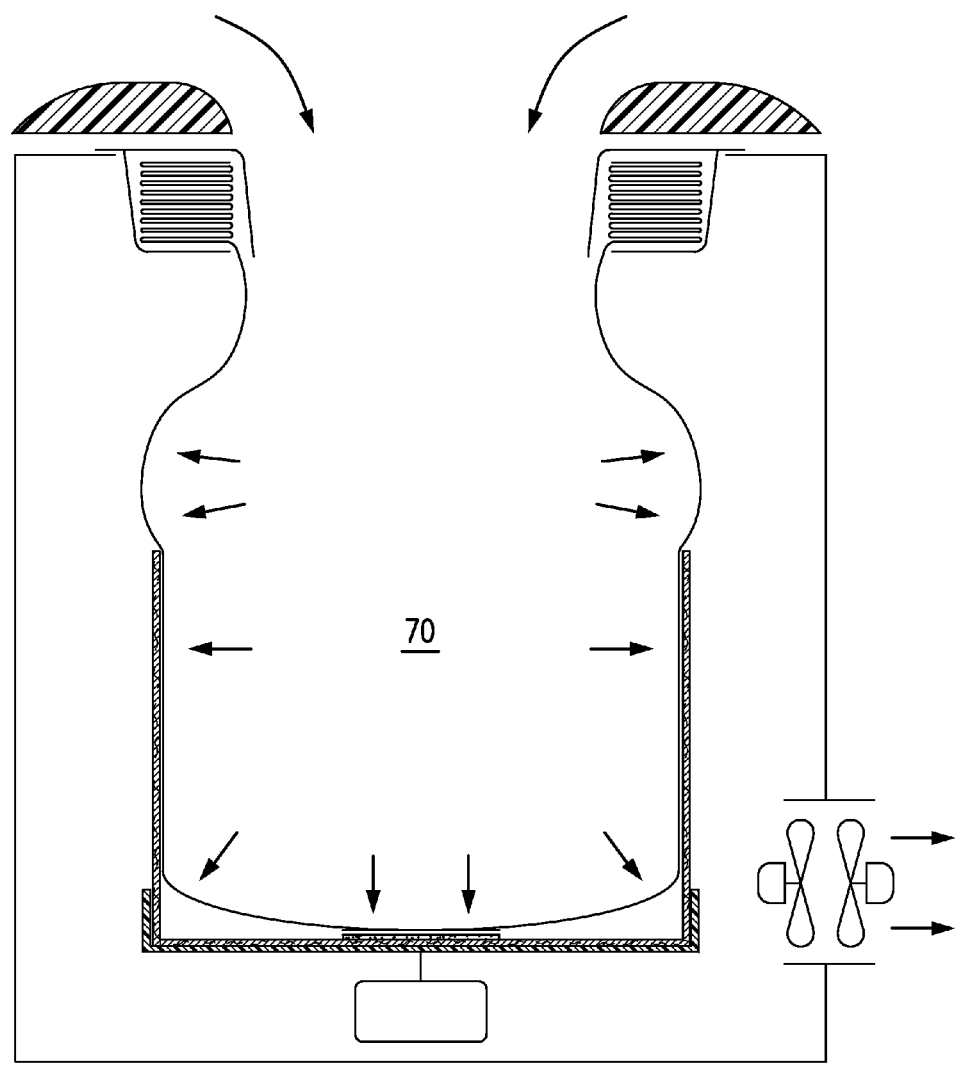
FIG. 5 is a schematic view of the toilet in a subsequent stage.

A partial exemplary sequence of steps or stages of use/operating is shown starting with FIG. 3. In the FIG. 3 stage, the top and seat may have been lifted clear of the opening 26 and the spent cartridge and container removed. A fresh opened container 80 may be placed into the support 82. An exemplary container 80 and support 82 have complementary interfitting planforms so as to allow a sidewall of the support 82 to engage a lower portion of the sidewall of the container 80 and rotate it about the axis 500. An exemplary planform is polygonal (e.g., hexagonal). The exemplary container 80 has a sidewall 140 and a base/bottom 142. In an exemplary embodiment, an adhesive means 144 (e.g., an applied tape or in situ-formed patch) is on the inboard/upper surface of the bottom 142. The exemplary tape is a double stick tape with a release film 146 along its upper surface. The release film may be peeled away either with the container 80 in place or therebefore. Thereafter, the cartridge 60 may be put in place and the cover and seat assembly reinstalled (FIG. 4). The exemplary cartridge 60 comprises a housing 160 having an interior 162 which defines an annular reservoir forming a bagging material storage area. The exemplary housing 160 comprises a lower inboard (radially) annular opening 164 through which the bagging material protrudes. The exemplary cartridge 60 also has an upper outboard flange 166 for mounting the cartridge to the body (e.g., resting atop a perimeter portion of the body surrounding the body opening 26). Initially, a closed end portion 170 of the bagging material centrally spans the annular opening 164. An accordion-like accumulation 172 of the bagging material is stored within the storage area 162. In an initial electric operation, the depressurizing fan 122 may be engaged with the pressurizing fan 120 disengaged. This reduces the pressure in the interior outside the bag causing the bag to expand downward and radially outward (FIG. 5). The bag lower end may eventually contact the upper surface of the tape 144 and stick thereto. This creates a large open interior waste-receiving volume 70 within the bag which may be more accommodating/inviting than if the bag were scrunched up. The depressurizing fan may then turn off. The operation of the fans may be via manual switches controlled by the user or via the controller at some level of automation. A user then uses the toilet. The use may be with the fans in the off condition. Alternatively, the depressurizing fan may be running to maintain the bag in a maximally expanded condition.

Figure 6:
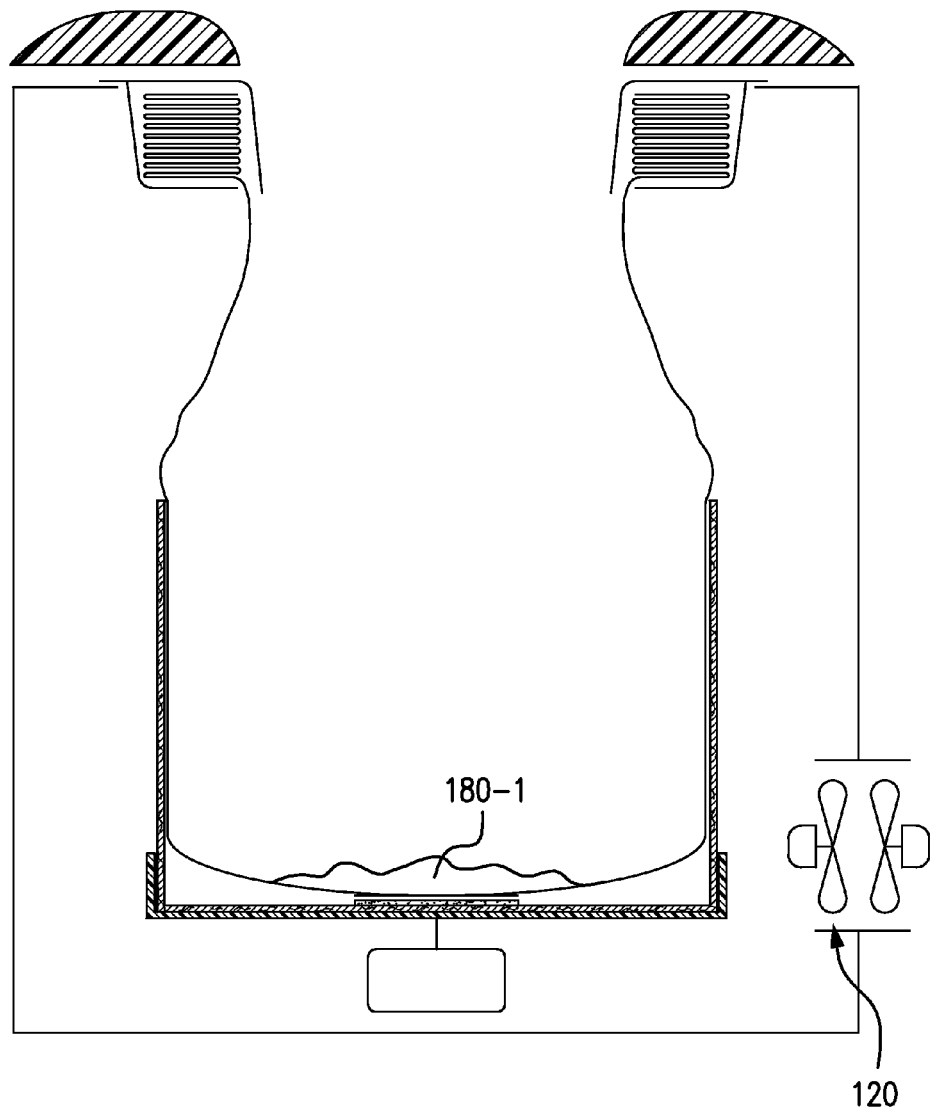
FIG. 6 is a schematic view of the toilet in a subsequent stage.
Figure 7:
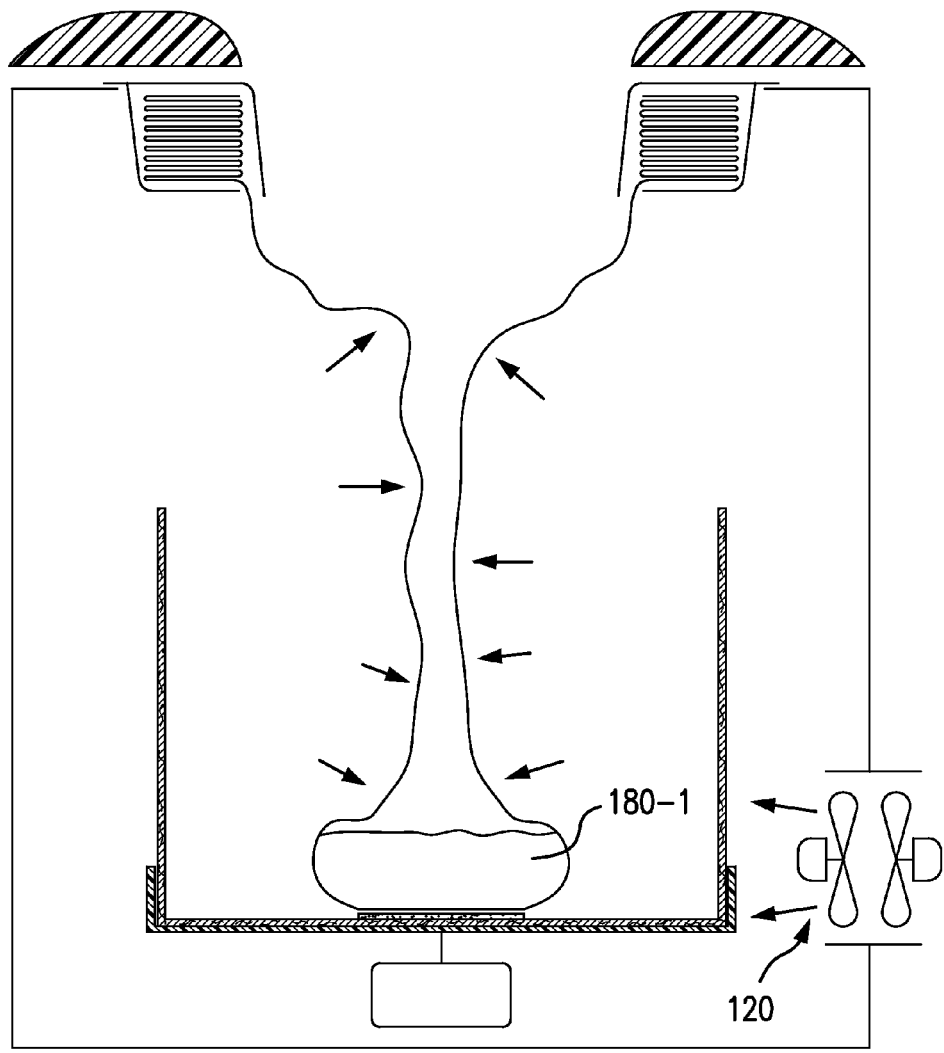
FIG. 7 is a schematic view of the toilet in a subsequent stage.
Figure 8:
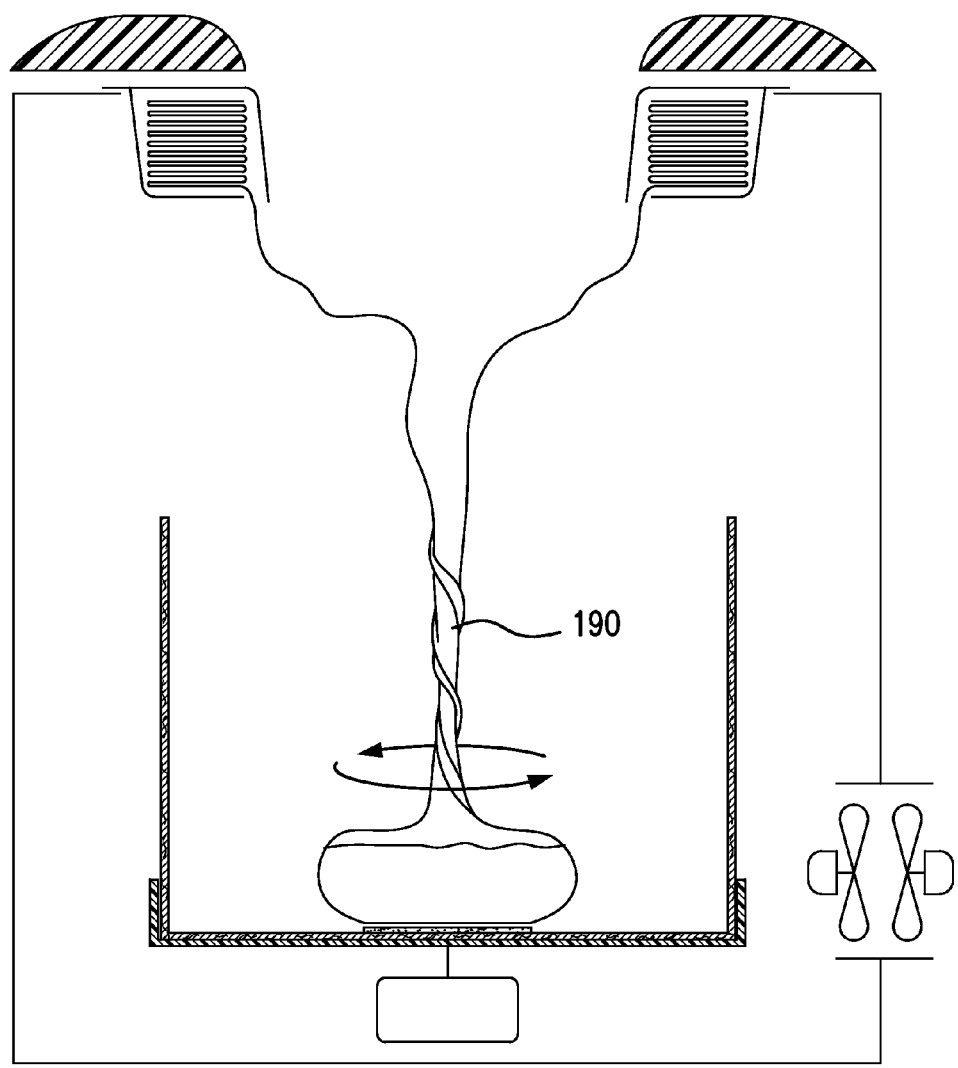
FIG. 8 is a schematic view of the toilet in a subsequent stage.
Figure 9:
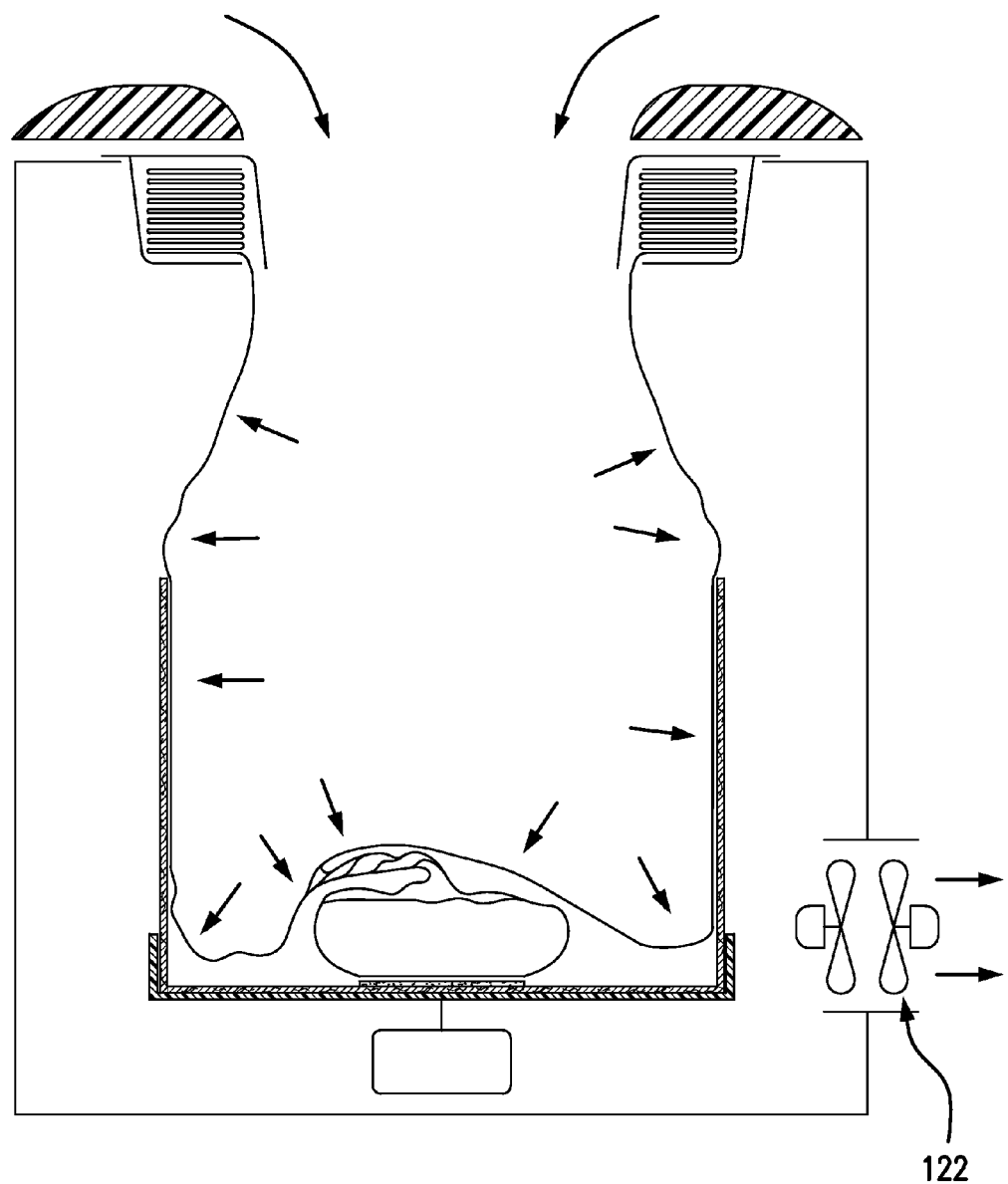
FIG. 9 is a schematic view of the toilet in a subsequent stage.
Figure 10:
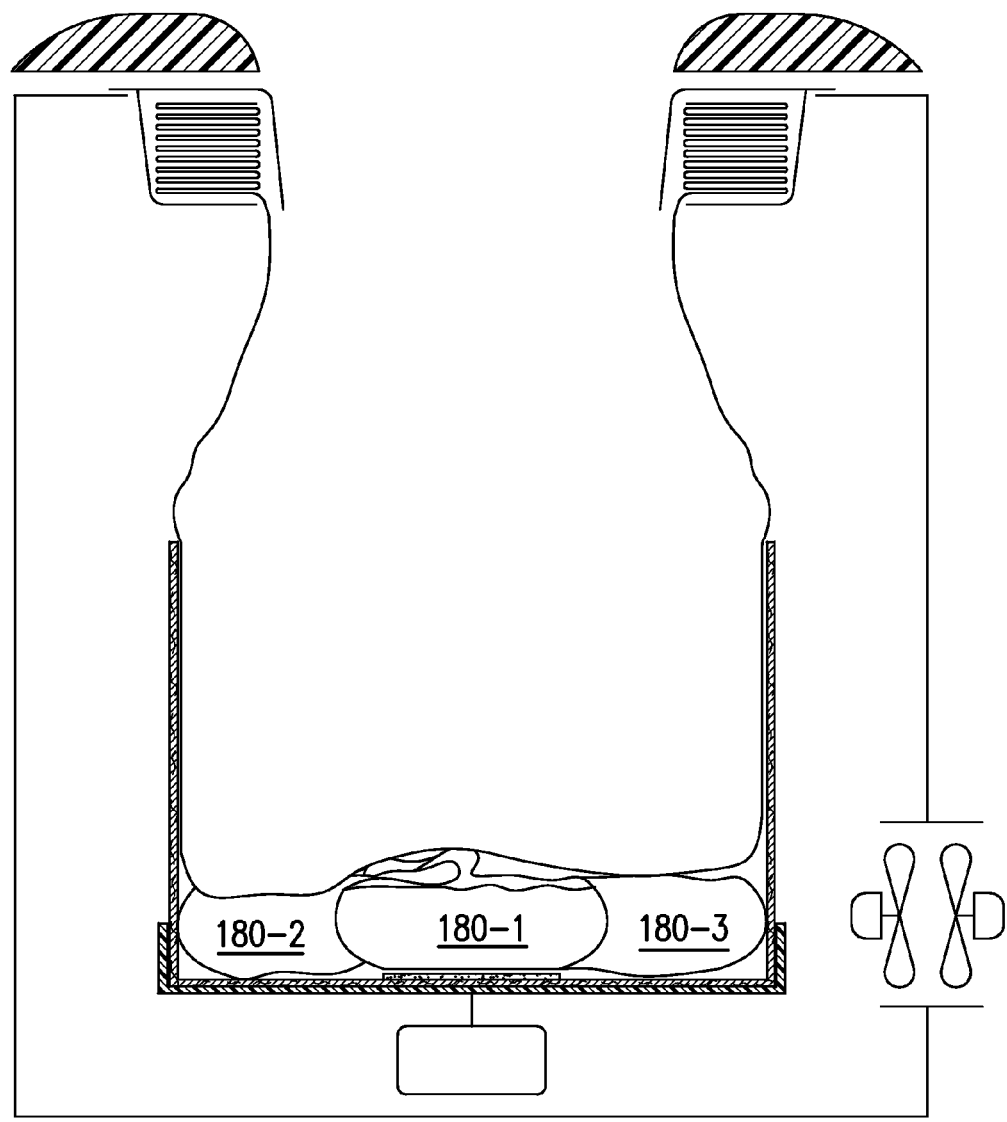
FIG. 10 is a schematic view of the toilet in a subsequent stage.

FIG. 6 shows the bag having received an initial received amount 180-1 of waste. Once this waste is received, an operation akin to flushing may occur (again either responsive to manual switching control or more fully automated via the controller). The pressurizing fan 120 is turned on, pressurizing the interior around the bag to compress the bag around the waste (FIG. 7). With the bag compressed, the motor may rotate the support and carton about the axis. The adhesive tape 144 will cause the terminal portion of the bag containing the waste to rotate with the support and container imparting a twist 190 above the waste. An exemplary rotation is by at least four revolutions, more narrowly, 4-10 revolutions. With the bag twisted, the depressurizing fan 122 may, in turn, be activated to depressurize the interior and expand a new portion of bagging material to create a new receiving portion of the bag above the twist (FIG. 9). This process may repeat multiple times as multiple bagged increments of waste 180-2, 180-3, etc. (FIG. 10) are formed with respective twists therebetween. Eventually, the box is full or the cartridge can run out of bag or a limit otherwise reached. For example, enough bagging material may be provided to bag the maximum amount of waste of an expected X installments. An exemplary X is 8-50, more narrowly, 10-30 or 10-25. The controller may simply be programmed to allow that many uses whereafter some sort of termination is signaled and/or effected. For example, the controller may alert the user to replace the cartridge. The controller may also initiate some form of closure action on the cartridge.

To discontinue use and remove a box, the cover 54 and attached seat assembly 30 is hinged upward from the main body, exposing the dispensing cartridge 60 which sits in a hole in web 50. The dispensing cartridge housing is lifted and pushed down through the supporting hole in the web (e.g., by slightly bending/flexing the cartridge housing). The housing may be crumpled and added to the contents of the box or the remaining bag material may be extracted from the housing and added separately to the box and the empty housing may be kept for recycling. The box is lifted from the support and removed from the interior. The securing band is removed from the box, allowing the flaps to be closed and the band may be further used to secure the flaps closed.

Preparing the toilet for use involves installing a new box and refill and may be accomplished as follows. A new box is transformed from its flattened storage/transport configuration to the open configuration and placed upon support 82. If the closing flaps are not already constrained to the sides of the box by the flexible band (or other device), it is added. The adhesive patch 144 in the bottom of the box is prepared by removing the protective film 146. The cartridge is placed into the hole in web 50, and supported there by its flange. The lid and seat assembly is lowered into position. The flush button is pushed and the last part of the cycle will evacuate space 24 and withdraw a section of bag from the dispenser and downward. The bag will continue to inflate until constrained by the sides and bottom of the box where it ultimately meets with the adhesive patch as discussed above.

Figure 11:
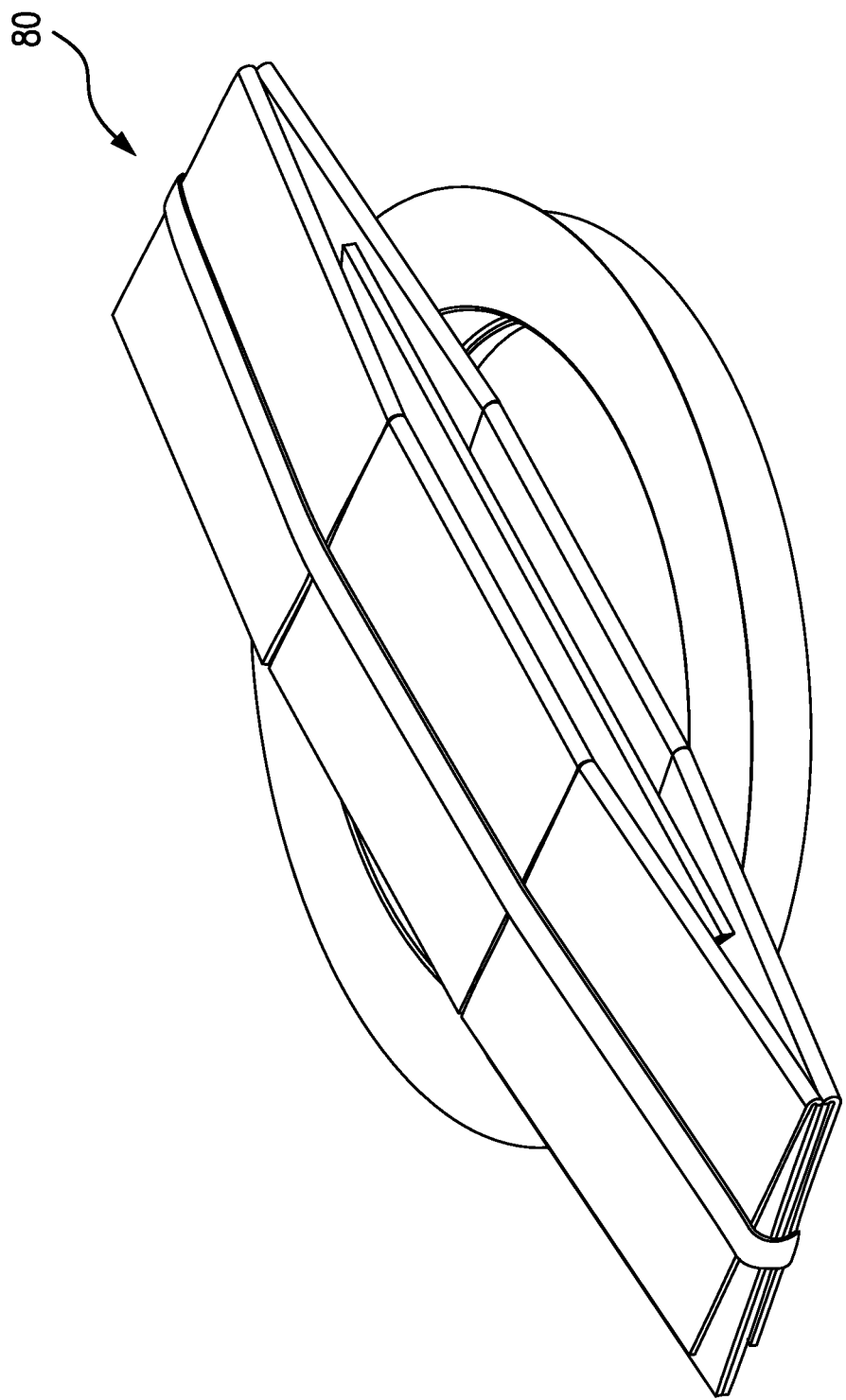
FIG. 11 is a view of a collapsed container and reservoir refill/cartridge kit.

FIG. 11 shows a collapsed container 80 and bag reservoir forming a cartridge combination for installing to the toilet. FIG. 12 shows further details of the reservoir or housing. The exemplary reservoir may be formed of two molded pieces 218 and 220 (e.g., of a plastic material such as styrene). The exemplary first piece 218 is formed with a generally transverse annular flange 222 and a central neck/collar 224 depending downward from a central aperture of the flange. The collar 224 may have an inwardly swept lower edge portion 226. Similarly, the piece 220 may have a flange 230 which may be secured (e.g., via thermal welding, chemical bonding, or adhesive) to an underside of a peripheral portion of the flange 222 to combine to form the flange 166. A sidewall 232 depends from the flange 230 spaced radially outward from the collar 224 to bound an outboard extreme of the baggage material storage area containing the accumulation 172. The exemplary piece 220 further includes a lower wall 234 extending radially inward from a lower end of the sidewall 232 to an edge 236 spaced outwardly of the lower edge/extreme 226 to define an annular opening 238 passing the bagging material. The exemplary cartridge and annular opening may be circular in planform. However, alternative embodiments may make these ellipsoid or asymmetric to correspond to the planform of a standard toilet seat opening.

Figure 13:
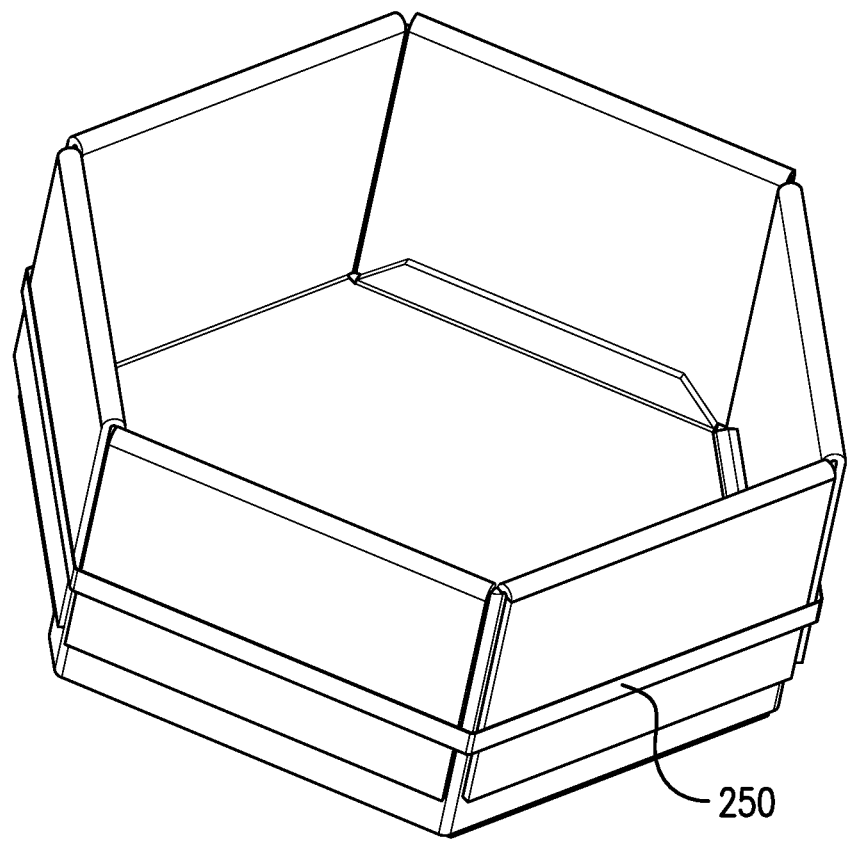
FIG. 13 is a view of an expanded container.

FIG. 13 shows a container having a base and six sidewalls with six top flaps extending from upper edges of the sidewalls and folded back outboard over the sidewalls and secured thereto via a strap 250 (e.g., an elastic strap or a rigid plastic band). The band may be put in place by the user after expanding the container or the flattened container may have the band attached. The band may be removed when the container is full allowing the flaps to be closed over the top for easy disposal.

Figure 14:
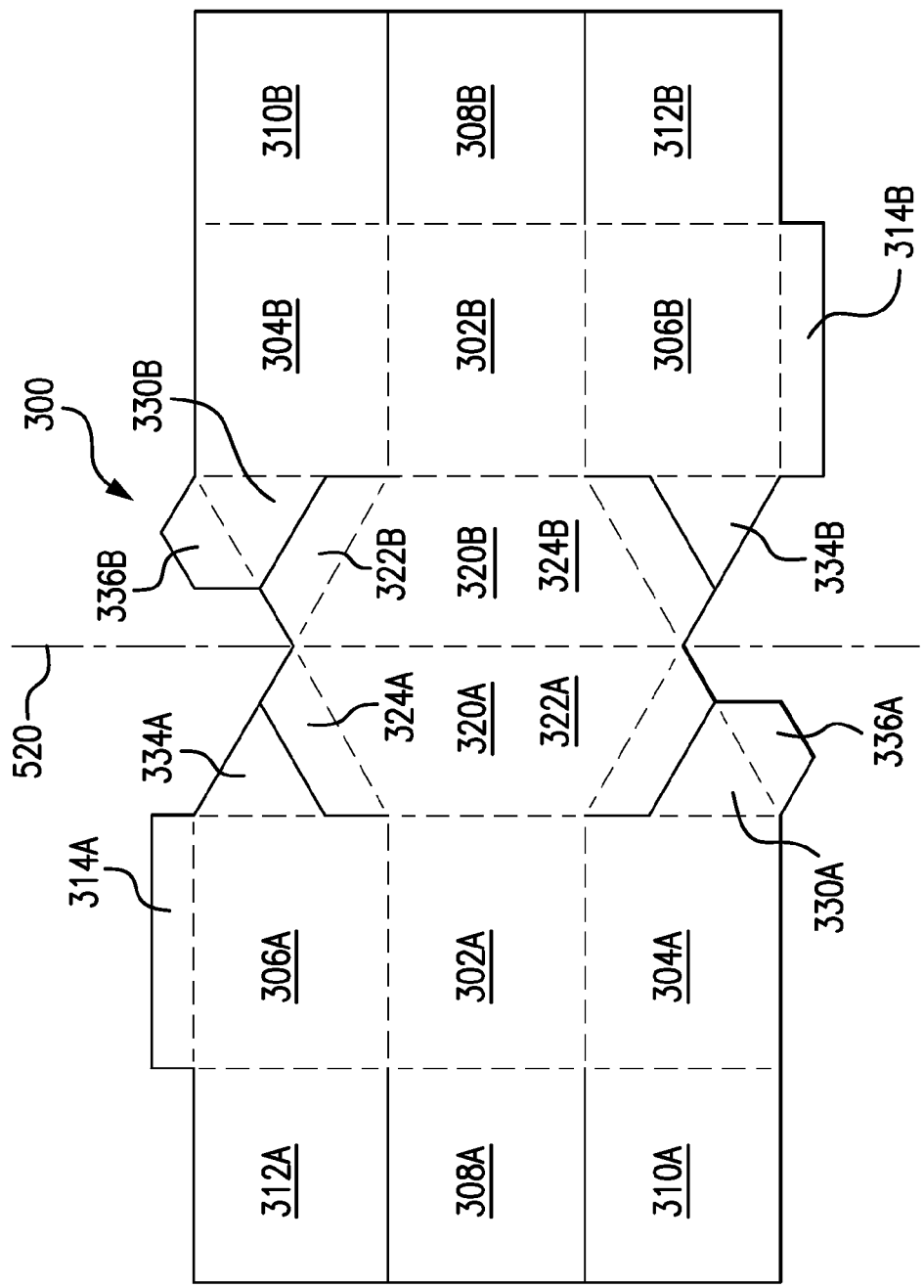
FIG. 14 is a view of a container-forming blank.
Figure 15:
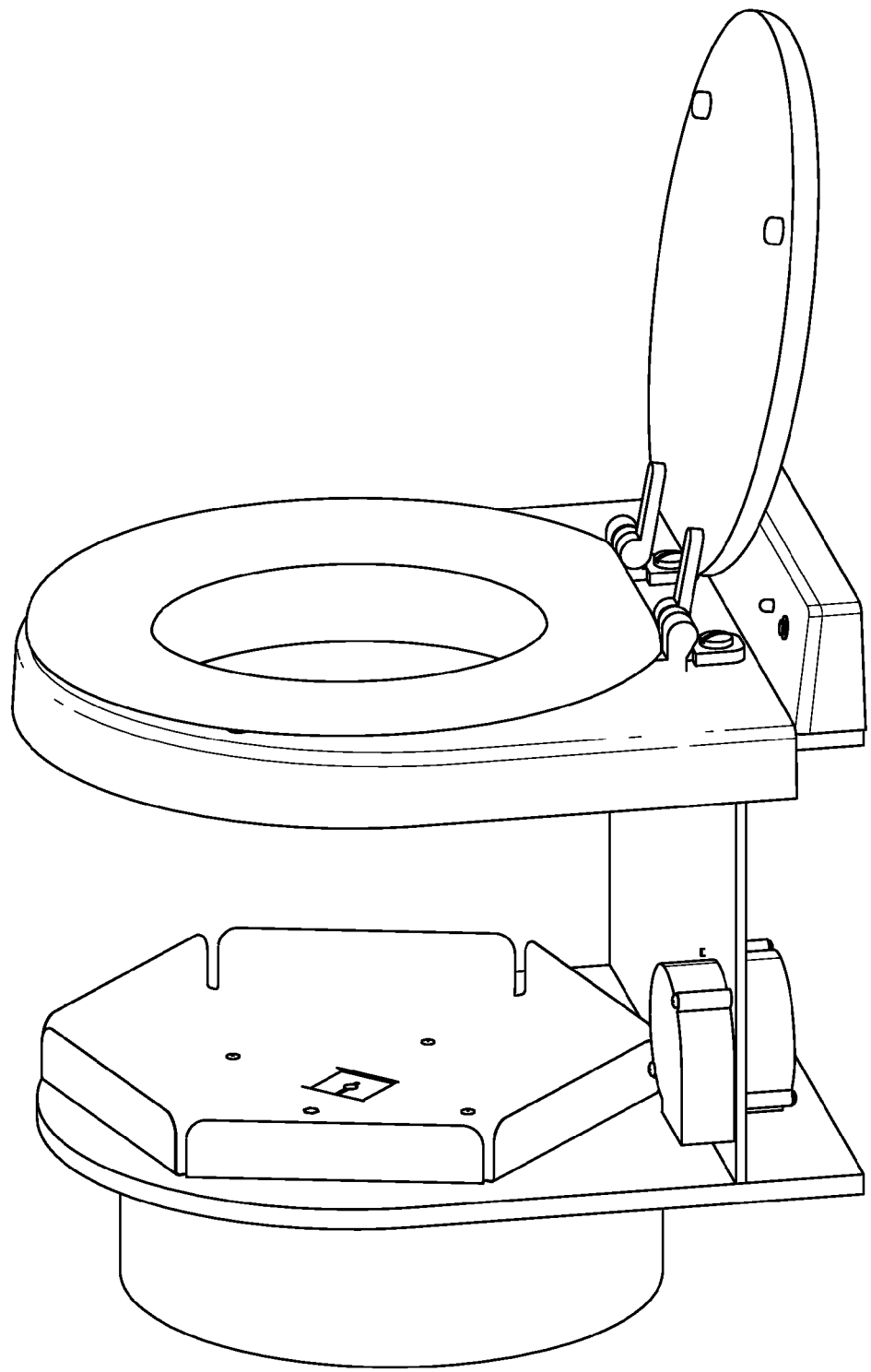
FIG. 15 is a view of the toilet with sidewall partially removed and cartridge removed.
Figure 16:
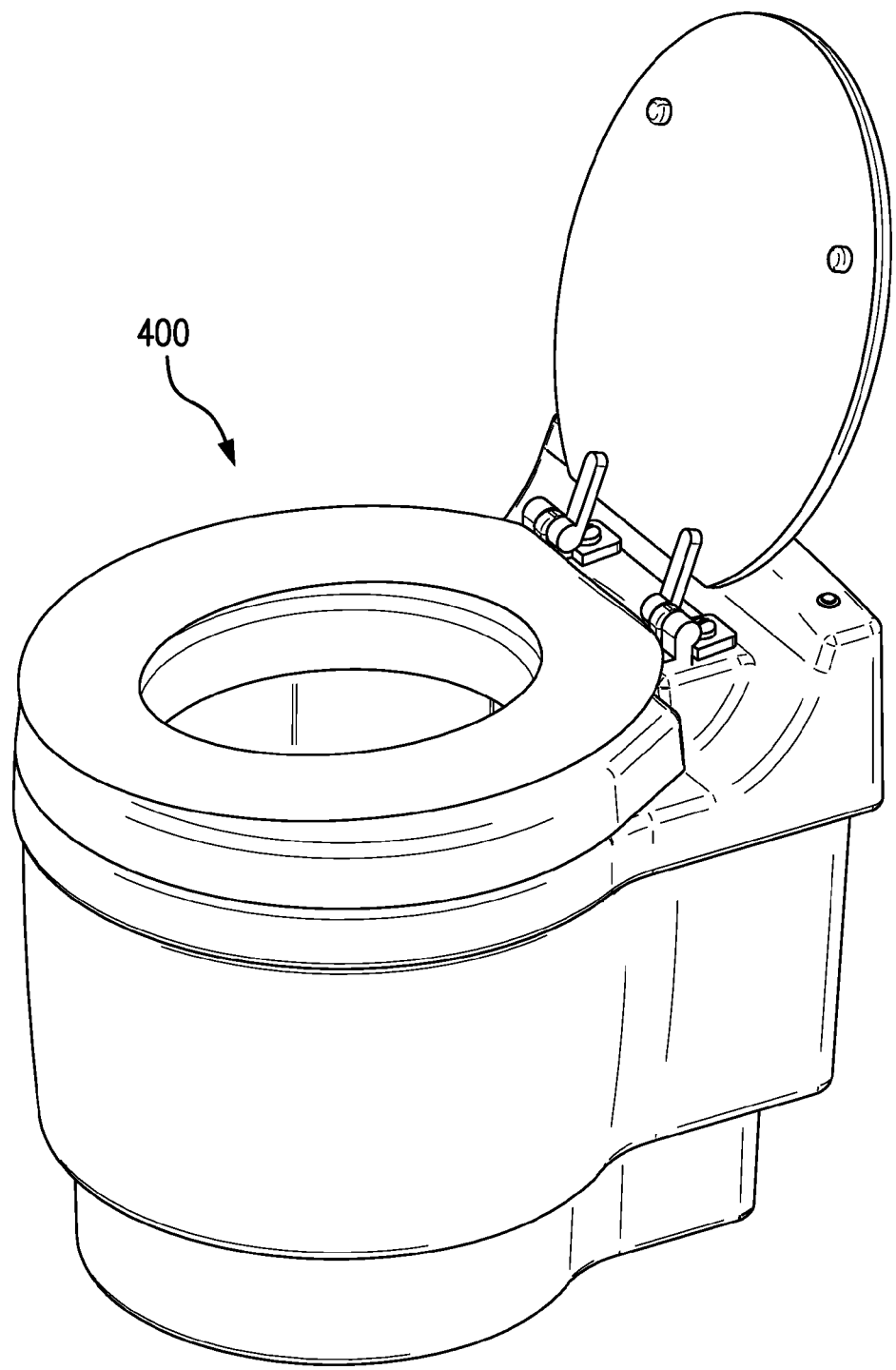
FIG. 16 is a view of a second toilet.

FIG. 14 shows a container-forming blank 300 (e.g., of corrugated cardboard, boxboard, or the like). In this example, solid lines show cuts (e.g., including external perimeter cuts from the blanking material and internal cuts between certain panels/tabs, etc.) Dashed lines represent embossed weakened areas forming fold lines. The exemplary blank 300 includes sections 302A&B, 304A&B, and 306A&B for forming respective sides of the exemplary hexagonal planform box along the sidewall thereof. The exemplary blank further includes portions 308A&B, 310A&B, and 312A&B respectively extending from fold lines at distal edges of the associated sections 302-306. The exemplary sections 302-6A fall to one side of a plane/line 520 whereas the sections 302-6B fall to the other side. In the exemplary blank 300, at each side there is a tab portion 314A&B. When the box is assembled, these portions 314A&B mate up with side-forming panels of the opposite side of the blank and may be secured thereto via adhesive to complete the sidewall.

On each side of the line/plane 520, the blank includes a section 320A, 320B formed as opposite halves of the ultimate hexagonal planform and separated by a central embossed fold line along the line 520 allowing collapsing of the container. Each of these is separated via a fold line from the respective central side-forming panel 302A and 302B. Along remaining edges of the hexagon, each has a tab-forming section 322A, 322B, and 324A and 324B. These form tabs that are folded up (toward the viewer) to stiffen the bottom panels 320A and 320B when assembled. Along outboard portions of the ultimate bottom edges of the lateral panels are tabs separated by embossed fold lines along such edges. The exemplary tabs are shown as 330A, 330B, 334A, and 334B. The exemplary tabs 334A and 334B are triangular completing a triangle with the adjacent tabs 324A and 324B. The other tabs 330A, 330B along outboard portions thereof are separated by fold lines from trapezoidal terminal tabs 336A, 336B.

To assemble the box, the side panels 302 are folded upwards, until vertical to the plane of the paper and further side panels 304A&B and 306A&B are folded approximately 60 degrees toward each other, thus forming a hexagonal prism. Glue tabs 314A and 314B are glued to the back (side away from viewer in FIG. 14) of panels 304B and 304A respectively, thereby establishing the sides of the box.

To keep bottom panels 320A&B in place, support structures are formed by gluing tab 336B to the back of tab 334A and likewise gluing tab 336A to the back of tab 334B.

By forming the box in this way, the structure can be flattened by moving the fold line between panels 320A&B upward, causing the two side panels 302A&B to move towards each other. The two aforementioned support structures will fold upward as well along fold lines between 336B and 330B and between 330A and 336A. The flattened box is easily returned to its box shape.

FIGS. 16-19 show a second toilet 400, otherwise generally similar in construction and operation to the first toilet. However, the box-like container 80 is eliminated. In its place, the support is vertically extended to form a bucket-like structure 402 (FIG. 17) and provide the lateral mechanical integrity that the container 80 would otherwise have had. A bag/liner 404 is then used in the bucket to serve the additional containment function that the box had provided. In use, after removal of a spent cartridge and prior to installation of a new cartridge, the bag/liner 404 is installed into the bucket and a portion 406 near an upper rim wrapped over the upper rim portion of the bucket.

The exemplary bucket 402 is a one-piece molded bucket (e.g., of plastic such as high density polypropylene). Like the support, it has a polygonal planform (e.g., octagonal). It is also waterproof to provide additional back-up containment.

The exemplary bucket has a square receptacle in the bottom to receive the square clamp 98 to impart rotational torque. During use, the bucket is lined with a liner bag (e.g., of approximately 0.002 inch (0.05 mm) thick polyethylene). This bag serves two purposes: one, as a secondary containment device for liquids, should the primary bagging material fail, two, as removal and disposal container or trash bag for the contained waste twisted within the primary bagging material. In this latter function, contained waste is removed by hinging back the toilet seat, lifting off the top piece 54 and lifting out the liner bag. The empty or partially empty refill may be put into the liner bag along with the waste to be disposed of.

Additionally this alternate embodiment has means for rotationally coupling the primary bagging material to the bucket. The exemplary means comprises a plate member 410. The exemplary plate member is of octagonal planform and dimensioned to fit within the bucket near the base thereof so as to provide the rotational coupling. The exemplary plate member is of a flat flexible material (e.g., cardboard) attached to the bottom or sealed end 420 (FIG. 19) of the liner material. In an exemplary manufacturing process, during the process of sealing the end of the bagging material, a straight line thermal sealing unit makes a first seal 422 at approximately 1-8 (2.5-20 cm) inches from the end of the bagging material. A second seal 424 is made close to (e.g., approximately one half inch (1.3 cm) from) the first. This serves as a secondary seal. The material is gathered and drawn through a slit 426 in the plate member and secured thereto. The slit may be straight or of any convenient shape to secure the bagging material. Exemplary securing comprises stapling between the seals and the adjacent end of the bag. When assembled, the seals may be below the plate, above the plate, or straddling the plate. Alternatively, the bagging material may be adhered to the plate member with adhesive or thermal, or ultrasonic welding The exemplary interfitting of plate member and bucket provides a means of imparting twist to the bagging material which otherwise has no direct connection to the rotating bucket. In this sense the octagonal plate member serves as a key to the octagonal bucket.

The exemplary plate member is of such dimensions so as to fit snugly into the bottom of the eight sided bucket. The frictional engagement of the snug fit keeps the bagging material from lifting upwards during the first few use cycles during which not enough waste has accumulated to keep the material from lifting out during the part of the use cycle when positive air pressure is imparted to collapse the bagging material as an aid to the twisting process.

An alternative keying means/member might comprise a bent metal wire (e.g., stainless steel or aluminum if reusable). If reusable, such a member may be excluded from the replacement cartridge as-sold. FIG. 20 shows a bent wire member 620 having an octagonal perimeter portion 622 for engaging the bucket sidewall. A central clamping portion 626 may grip the bag in a self spring fashion or the bag may be tied or otherwise secured thereto. FIG. 21 shows a similar member 660 dimensioned to to bias against just two opposite corners of the octagon and their adjacent sides. Among other alternatives are a bow-tie planform (e.g., with the bagging material tied to or otherwise secured at the waist of the bow-tie and the bow-tie ends contacting opposite facets of the sidewall and corners adjacent thereto). Also, molded plastic variants are possible.

FIG. 19 additionally shows a gasket 440 along the underside of the flange 166. An exemplary gasket 440 is a polymeric foam tape adhered to the flange underside fully circumscribing the cartridge. Such a gasket on the flange, toilet body, or both, may be desirable if there would otherwise be excessive air leakage. FIG. 19 also shows a similar gasket 441 along an upper surface of the flange. Whereas the gasket 440 seals with a main portion of the top of the body, the gasket 441 seals with the underside of a cover (e.g., molded plastic). As with the gasket 440, its positioning may be reversed and installed on the cover underside or both flange top and cover underside depending upon whether there otherwise would be excessive air leakage. Whether air leakage is excessive may depend on a number of design considerations of the toilet including materials, manufacturing tolerances, loading tolerances, fan size, and the like. Such a gasket may also help keep the housing interior cleaner than otherwise.

Additionally, the controller is shown as a printed circuit board (PCB) 450 (FIG. 17) more physically remote of the battery 452 which, for replaceability purposes, is placed in its own bay recessed in the outer housing (e.g., and held by a spring clip 454). Additionally, there is a one piece molded body/outer housing 460 eliminating the web 50. An inner housing 462 (e.g., formed as a wall assembly) isolating spaces containing the fan 120 and motor/transmission from the bucket area (this isolates electrical components from exposure to the user when changing bags, etc.). The inner housing 462 may be formed as an assembly of molded plastic pieces screwed, adhered, welded or otherwise secured in place. The inner housing may be vented or its securing may be non-airtight so as to allow withdrawal of air from the interior around the bucket.

In an exemplary embodiment, the fan 122 is mounted generally external to the outer housing 460 in a compartment enclosed by a panel 470 (e.g., sheet metal). Operation may be otherwise similar to the first embodiment. The material strength of the liner 404 may keep it secured to the bucket (although additional securing may be provided via tapes, clamps, or the like). Pressurizing of the interior will cause the expanded continuous bagging material to peel away from the liner. Upon depressurizing, there may be trapped air in an approximately annular space 480 along a lower portion of the bucket between the liner and expanded bagging material. This trapped air may prevent the bagging material from further expanding downward and outward. However, this is not believed a problem and may actually help centrally localize the next received waste.

Although a toilet apparatus has been described, the foregoing principles may be applied to other disposal apparatus including diaper disposal apparatus. In such a case, similar overall structure and bag structure might be provided to that of the existing (baseline) non-toilet apparatus.

Although two separate fans are shown respectively providing pressurization and depressurization, these functions may alternatively be provided by a single fan. Additionally, one of these functions may be removed. For example, depending upon the nature of the waste being disposed of and the internal geometries, pressurization may be unnecessary; whereas, depressurization may be necessary or desirable to expand the bagging material. Alternatively, in some situations, depressurization to expand the bagging material may be unnecessary (either because the material self-expands or because due to the type of waste the expansion is unnecessary); whereas, pressurization is desired (e.g., to pre-evacuate air prior to or during twisting). For example, expansion if not achieved by other means may be particularly desirable in a toilet where one wants to keep the bag away from one's person.

One or more embodiments of the present invention have been described. Nevertheless, it will be understood that various modifications may be made without departing from the spirit and scope of the invention. For example, frequency of anticipated use and servicing may influence details of any particular implementation. Accordingly, other embodiments are within the scope of the following claims.

What is claimed is:

1. A method for operating a toilet, the method comprising:
   receiving waste through an opening of a body of the toilet and into a receiving portion of a continuous bag;
   pressurizing an interior of the body to compress the bag around the waste;
   twisting the bag to isolate the received waste from a portion of the bag thereabove; and
   expanding a new receiving portion of the bag above the twist, the expanding comprises depressurizing the interior around the bag below an ambient pressure.

2. The method of claim 1 performed repeatedly with each new receiving portion replacing the prior receiving portion.

3. The method of claim 1 wherein:
   the pressurizing is to a gauge pressure of at least 1.5 inches of water; and
   the depressurizing is to a gauge pressure of at least 2.5 inches of water.

4. The method of claim 1 wherein the depressurizing is performed by a first fan and not a second fan whereas the pressurizing is performed by the second fan and not the first fan.

5. The method of claim 1 further comprising:
   installing the continuous bag.

6. The method of claim 5 wherein the installing comprises installing a cartridge, the cartridge comprising:
   an annular reservoir forming a bagging material storage area; and
   the continuous bag.

7. The method of claim 6 wherein the installing comprises:
   securing the bag supply rotationally relative to a support.

8. The method of claim 6 wherein the cartridge further comprises:
   a plate member secured to the bag supply.

9. The method of claim 8 wherein installing comprises:
   extending the plate member away from the reservoir; and
   engaging the plate member to a support, the plate member and support interfitting to allow the support to transmit rotation to the plate member.

10. The method of claim 9 wherein:
    the support is a bucket and the engaging places the plate member into the bucket.

11. A method for operating a toilet, the method comprising:
    receiving waste through an opening of a body of the toilet and into a receiving portion of a continuous bag;
    twisting the bag to isolate the received waste from a portion of the bag thereabove; and
    depressurizing an interior to below an ambient pressure to expand a new receiving portion of the bag above the twist.

12. A method for operating a waste receiving apparatus, the method comprising:
    receiving waste through an opening of a body of the waste receiving apparatus and into a receiving portion of a continuous bag; and
    twisting the bag to isolate the received waste from a portion of the bag thereabove, further comprising at least one of:
    at least partially prior to the twisting, pressurizing an interior of the body to compress the bag around the waste; and
    at least partially after the twisting, depressurizing the interior to expand a new receiving portion of the bag above the twist.

13. A method for operating a toilet, the method comprising:
    receiving waste through an opening of a body of the toilet and into a receiving portion of a continuous bag;
    pressurizing an interior of the body surrounding the bag to compress the bag around the waste;
    twisting the bag to isolate the received waste from a portion of the bag thereabove; and
    expanding a new receiving portion of the bag above the twist.

* * * * *